United States Patent [19]

Fishel

[11] 3,794,079

[45] Feb. 26, 1974

[54] COMBINATION STRENGTH/HYDRAULIC CABLE

[75] Inventor: Kenneth R. Fishel, Del Mar, Calif.

[73] Assignee: The United States of America as represented by the Secretary of the Navy, Washington, D.C.

[22] Filed: Aug. 27, 1971

[21] Appl. No.: 175,525

[52] U.S. Cl.................. 138/103, 248/49, 138/107
[51] Int. Cl............................................. F16l 55/00
[58] Field of Search ... 138/103, 111, 115, 106, 107, 138/110, 178; 248/49, 50, 60, 61, 62; 285/61, 114

[56] References Cited
UNITED STATES PATENTS

| | | | |
|---|---|---|---|
| 2,139,888 | 12/1938 | Fausek | 138/115 |
| 2,122,335 | 6/1938 | Berman | 138/111 X |
| 3,334,663 | 8/1967 | Peterson | 138/110 X |
| 2,144,478 | 1/1939 | Baumgratz | 138/103 |
| 2,778,609 | 1/1957 | Peeps | 138/111 X |
| 2,722,237 | 11/1955 | Rosel | 138/103 X |
| 2,490,333 | 12/1949 | Barham | 285/114 X |

*Primary Examiner*—Herbert F. Ross
*Attorney, Agent, or Firm*—Richard S. Sciascia; Ervin F. Johnston

[57] ABSTRACT

A combination strength/hydraulic cable including a load carrying cable having load carrying end fittings; and a pair of flexible hydraulic hoses, each hydraulic hose having end fittings. The load carrying cable and the pair of hydraulic hoses are bonded integrally within an elastomeric jacket. The end fittings extend from the elastomeric jacket for connection to respective components.

1 Claim, 3 Drawing Figures

PATENTED FEB 26 1974

3,794,079

KENNETH R. MISHEL,
INVENTOR.

BY ERVIN F. JOHNSTON,
ATTORNEY.

COMBINATION STRENGTH/HYDRAULIC CABLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In some underwater applications it is necessary for a control vehicle to supply hydraulic power to a grabber device which is suspended therebelow. The control vehicle hovers over an object to be retrieved and the grabber device is controlled for grabbing the object and retrieving it to a desired location. In order to accomplish this purpose the graber device is supported by a strength cable and at least a pair of hydraulic hoses, one hose being a supply line and the other hose being a return line.

In the past the strength cable and the necessary hydraulic hoses were either run separately or were formed into a bundle, after which they were taped or tied together at given intervals. When the strength cable and hydraulic hoses were run separately they became entangled and allowed the entrapment of foreign particles. This is because the strength cable will inevitably twist back and forth during operations, and the situation even gets worse when the grabber device touches bottom and the strength cable and hoses slacken. A serious entanglement of the hydraulic hoses will stop flow of the fluid and render the apparatus inoperable. Even when the elements were taped or tied together foreign particles became entrapped therebetween. In both methods the strength and hydraulic elements were subjected to chafing and cutting when in contact with other objects, and they were very difficult to coil for stowage purposes.

STATEMENT OF THE INVENTION

The aforementioned problems have been overcome by providing a combination strength/hydraulic cable. This cable includes a load carrying cable having load carrying end fittings; and a pair of flexible hydraulic hoses, each hose having end fittings. The load carrying cable and the pair of hydraulic hoses are bonded integrally within an elastomeric jacket, and the fittings extend from the elastomeric jacket for connection to respective components. By bonding the pair of hydraulic hoses directly to the load carrying cable entanglement between these elements is eliminated. Where previously the inevitable twist of the strength cable would cause the hydraulic hoses to become entangled with each other as well as with the strength cable, now the elements are bonded together, and, when twisting occurs, they move as an integral unit. Further, the elastomeric jacket protects the strength and hydraulic elements from being chafed or cut, and the elements are no longer loaded with an entrapment of foreign matter from the ocean environment.

STATEMENT OF OBJECTS OF THE INVENTION

An object of the present invention is to provide a combination strength/hydraulic cable wherein the strength and hydraulic elements do not become fouled or tangled with respect to one another.

Another ojbect is to provide a combination strength cable and a pair of hydraulic hoses for connection between a control vehicle and grabber device whereupon twist of the strength cable this cable and the hoses do not become entangled, the elements are protected from chafing and cutting, foreign matter does not become entrapped about the elements, and coiling and stowage of the unit is greatly facilitated.

Other objects and many of the attendant advantages of this invention will be readily appreciated as it becomes better understood by reference to the description and accompanying drawing.

DESCRIPTION OF PREFERRED EMBODIMENT

Figure 1:
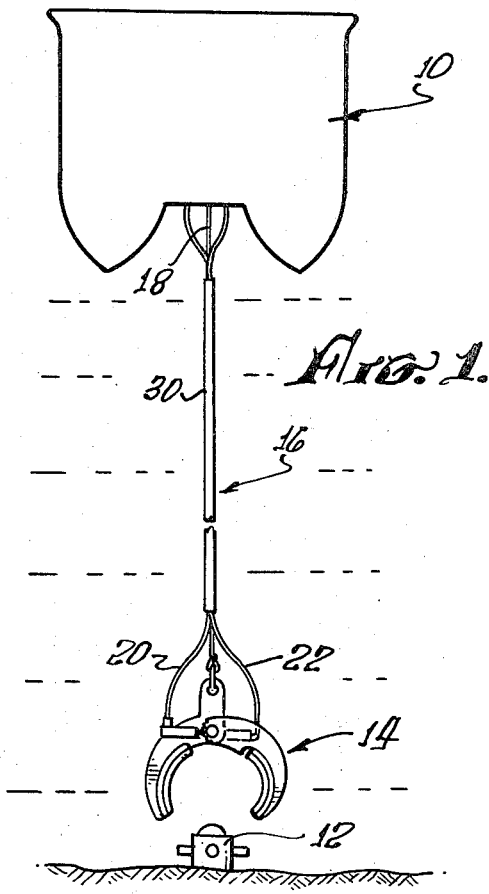
FIG. 1 is an ocean elevation view of a grabber device suspended below a control vehicle by the combination strength/hydraulic cable.

Referring now to the drawing wherein like reference numerals designate like or similar parts throughout the several views, there is shown in FIG. 1 a control vehicle 10 hovering over an object 12 which is to be retrieved from the ocean bottom. This retrieval is accomplished by a grabber device 14 which is supported below the control vehicle and is operated by a combination strength/hydraulic cable 16. The grabber device 14 is shown as a claw which opens and closes which can be hydraulically operated by a pair of hydraulic hoses.

Figure 2:
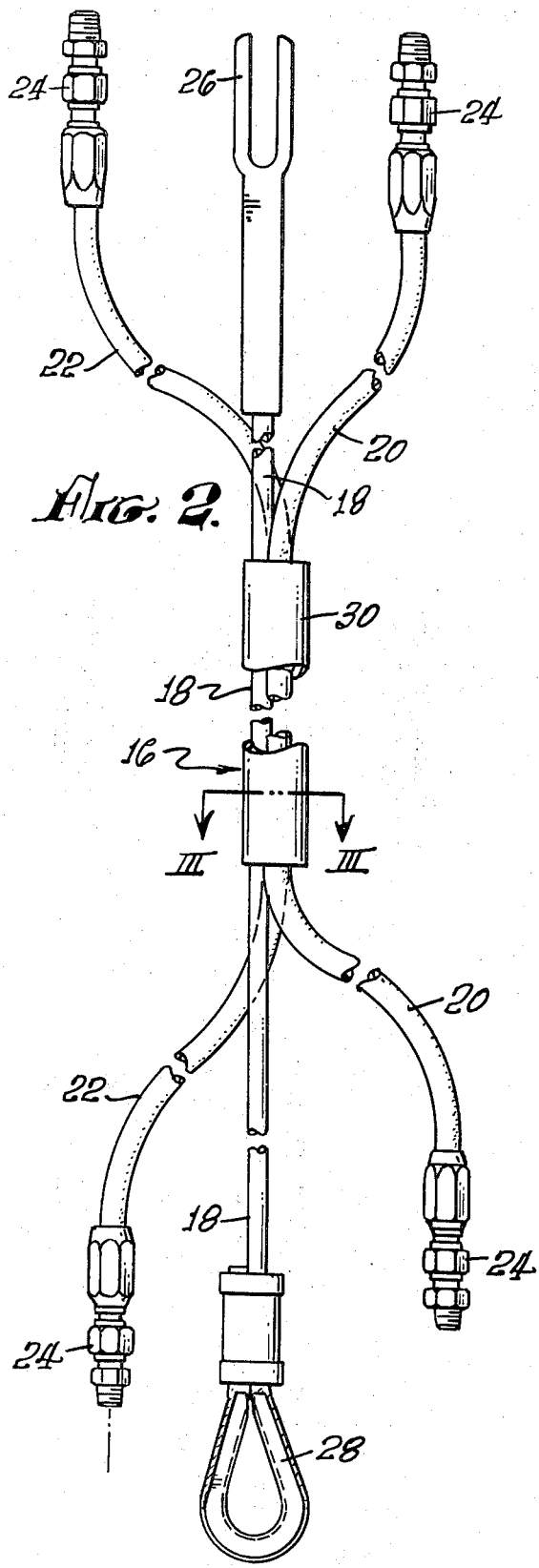
FIG. 2 is a longitudinal side view of the combination strength/hydraulic cable.

As illustrated in FIG. 2, the combination strength/hydraulic cable 16 includes a strength carrying cable 18, and a pair of hydraulic hoses 20 and 22. The strength carrying cable 18 may be stainless steel wire rope, and the hydraulic hoses may be Vinyl tubing, the hose 20 being a hydraulic supply line and the hose 22 being a hydraulic return line.

In order for these elements to perform their functions they must be provided with end fittings. The hydraulic hoses 20 and 22 may be provided with standard hydraulic hookup end fittings 24. The strength cable 18 may be provided with a top bifurcated element 26 and a bottom end loop 28 as end fittings for connection between the control vehicle 10 and the grabber device 14.

Figure 3:
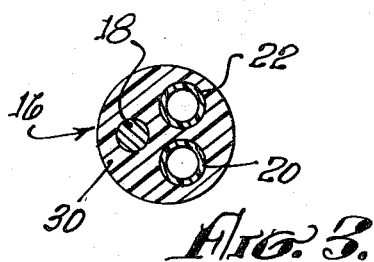
FIG. 3 is a cross-sectional view taken along plane III—III of FIG. 2.

It is obvious that without additional consideration the strength cable 18 and pair of hydraulic hoses 20 and 22 would become entangled with one another as the grabber device 14 twists about the control vehicle 10 in its recovery of the object 12. A serious entanglement of the hydraulic hoses will stop the flow of fluid so that the grabber device can no longer be controlled for grabbing purposes. This problem has been overcome by integrally bonding the load carrying cable 18 and the pair of hydraulic hoses 20 and 22 with an elastomeric jacket 30. As illustrated in FIG. 3, the elements may be respectively uniformly spaced from one another so that there is no chafing therebetween, and the spacing of these elements as they exit the jacket ensures easy cleaning of abrasive foreign particles. The elastomeric material should completely fill all voids and jacket all elements. The jacket 30 extends along the length of the cable 18 and hoses 20 and 22 with only sufficient lengths of the strength cable and hoses extending from both ends of the jacket for connection to the respective components of the control vehicle 10 and the grabber device 14. Accordingly, the hoses 20 and 22 commence their bend immediately upon their extension from the jacket 30 for their respective connections so that there is no possibility of entanglement between the elements.

The elastomeric jacket 30 may be formed about the elements by extruding the cable 18 and hoses 20 and 22 along with a thermo-setting or thermo-plastic binding agent, such as a polyurethane elastomer or other elastomeric substance, through an extrusion dye to give a smooth flexible unit of the required cross-sectional size or shape and length. Alternatively, the elastomer jacket may be molded about the cable and hoses in a mold of tubular shape. If desired, the cable and hoses may be pretensioned prior to setting of the elastomeric material.

It is now readily apparent that the present invention provides a novel combination strength/hydraulic cable which can be used for supporting and controlling a grabber device suspended below a control vehicle. There will be no entanglement between the elements, the elements are protected from chafing and cutting, and the combination cable can be easily coiled and stowed.

Obviously many modifications and variations of the present invention are possible in the light of the above teachings. It is therefore to be understood that within the scope of the appended claims the invention may be practiced otherwise than as specifically described.

I claim:

1. A combination strength/hydraulic cable comprising:
   a load carrying stainless steel wire rope having a load carrying fitting located at each end thereof;
   one end fitting of the wire rope being a bifurcated element and the other end fitting thereof being a loop formed from said wire rope; a pair of flexible hydraulic hoses, each hydraulic hose having a fitting located at each respective end thereof;
   the wire rope and the pair of hydraulic hoses being bonded intermediate their ends integrally within a flexible elastomeric jacket;
   said wire rope and hydraulic hoses being prestressed within said elastomeric jacket;
   the wire rope and hoses being uniformly spaced from one another within said jacket throughout the entire length of the jacket;
   the elastomeric material filling all voids about the wire rope and hoses within the jacket;
   said wire rope, hoses, and fittings extending from the elastomeric jacket for connection to respective components; and
   the portions of the wire rope and the hydraulic hoses which extend beyond the elastomeric jacket being only long enough for connection of the fittings to respective components.

* * * * *